US009392472B2

(12) United States Patent
Vaderna et al.

(10) Patent No.: US 9,392,472 B2
(45) Date of Patent: Jul. 12, 2016

(54) TECHNIQUE FOR EVALUATING EVENTS IN A TELECOMMUNICATION NETWORK

(71) Applicant: Telefonaktiebolaget L M Ericsson (publ), Stockholm (SE)

(72) Inventors: Peter Vaderna, Budapest (HU); László Toka, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 14/317,262

(22) Filed: Jun. 27, 2014

(65) Prior Publication Data

US 2015/0004963 A1   Jan. 1, 2015

(30) Foreign Application Priority Data

Jun. 28, 2013   (EP) .................................... 13003304

(51) Int. Cl.
*H04W 24/00* (2009.01)
*H04W 24/04* (2009.01)
*H04W 24/08* (2009.01)

(52) U.S. Cl.
CPC .............. *H04W 24/04* (2013.01); *H04W 24/08* (2013.01)

(58) Field of Classification Search
USPC ......................................................... 455/423
See application file for complete search history.

(56) References Cited

U.S. PATENT DOCUMENTS

| | | | |
|---|---|---|---|
| 7,941,136 B2 * | 5/2011 | Reed | H04L 41/0816 455/423 |
| 2011/0009136 A1 | 1/2011 | Mantravadi et al. | |
| 2012/0322438 A1 | 12/2012 | Báder | |

FOREIGN PATENT DOCUMENTS

WO   2011069546 A1   6/2011

OTHER PUBLICATIONS

Unknown, Author, "3GPP TS 32.401, V11.0.0 (Sep. 2012)", 3rd Generation Partnership Project; Technical Specification Group Services and System Aspects; Telecommunication management; Performance Management (PM); Concept and requirements (Release 11), Sep. 2012, pp. 1-29.

* cited by examiner

*Primary Examiner* — Joel Ajayi
(74) *Attorney, Agent, or Firm* — Murphy, Bilak & Homiller, PLLC

(57) ABSTRACT

A technique for evaluating events in a telecommunication network based on an occurrence of a plurality of the events in the telecommunications network is disclosed. In a first method aspect, the method comprises the steps of selecting at least two parameters of the events; categorizing each of the parameters into a respective finite set of values; defining, for at least a part of conjunctions between the respective finite sets of values, a dedicated counter per conjunction; and altering, upon the occurrence of an individual event, the respective counter if the parameters of the occurred event match the respective conjunction between the finite sets of values.

14 Claims, 8 Drawing Sheets

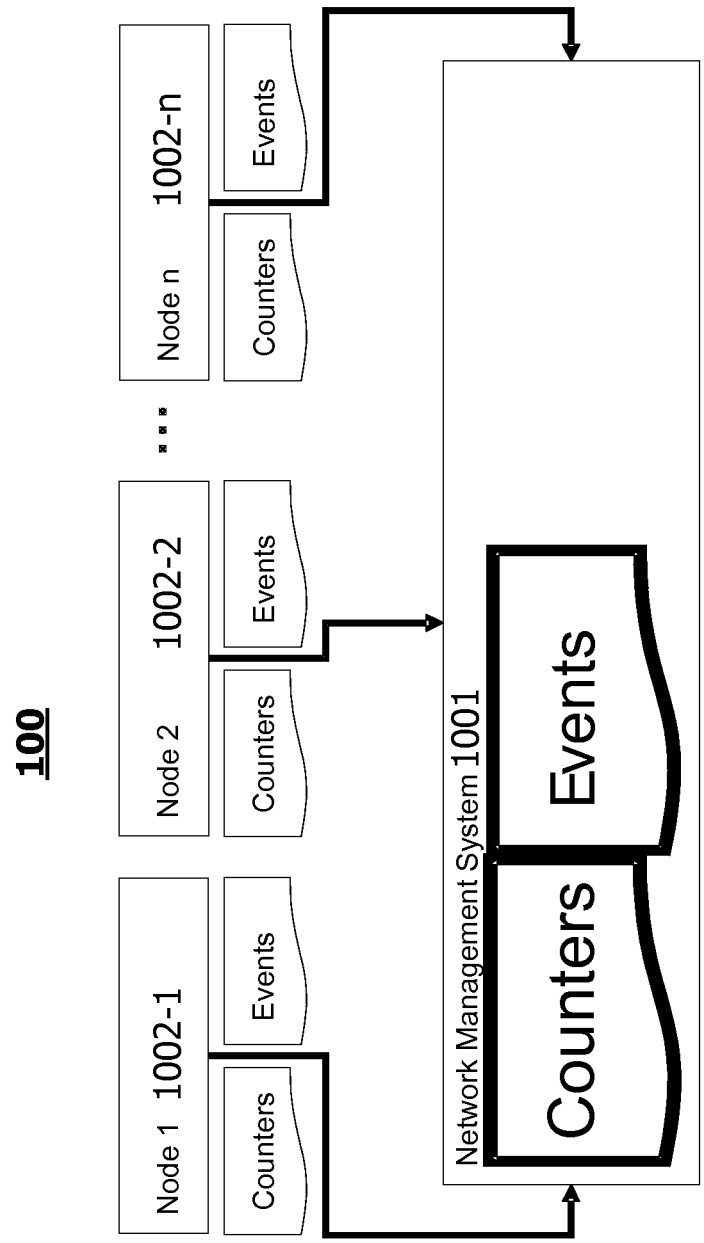

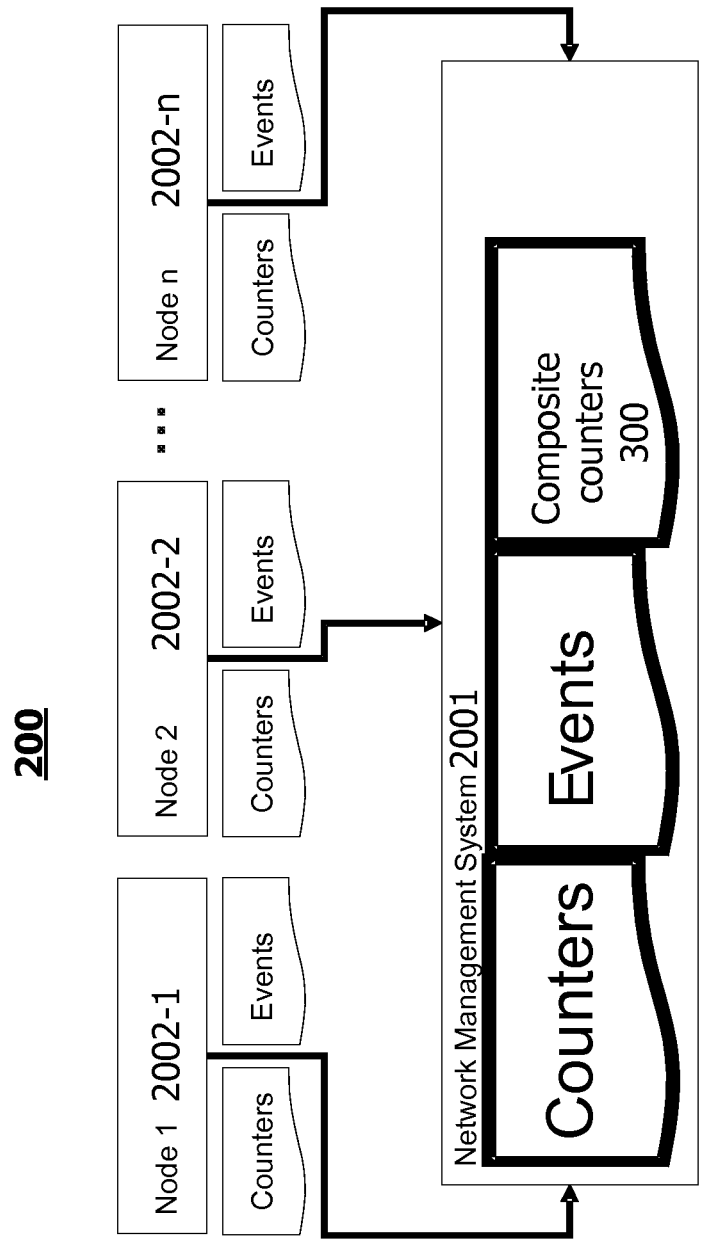

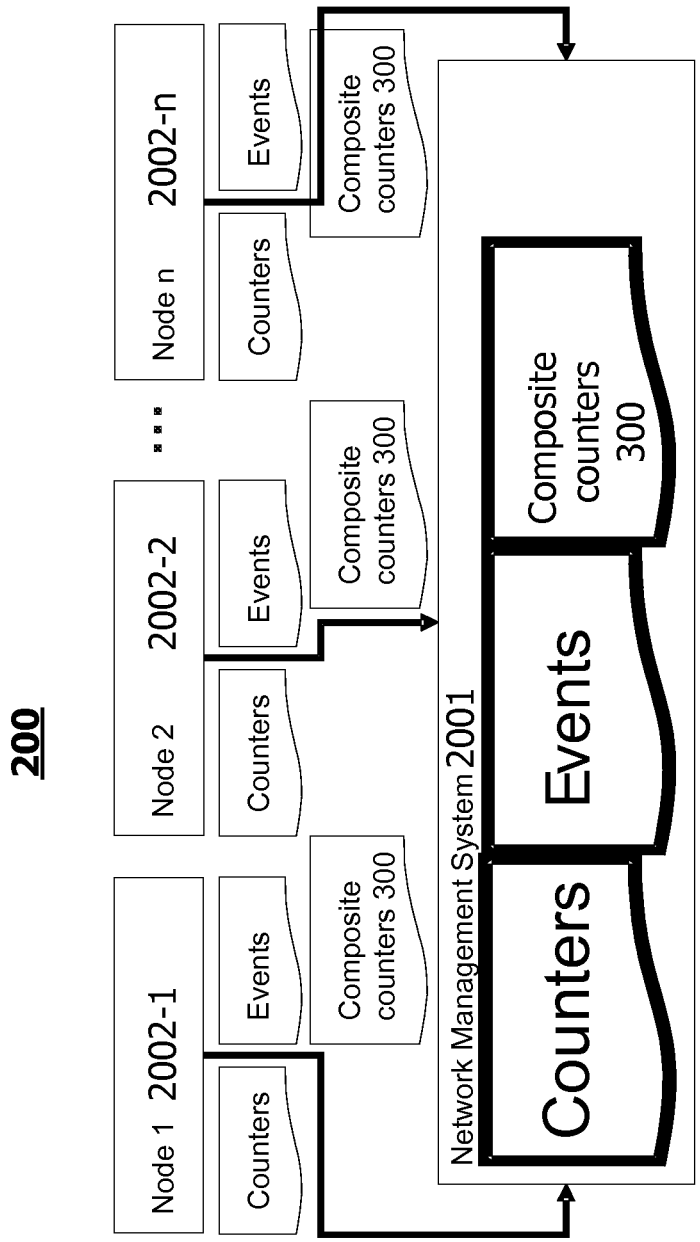

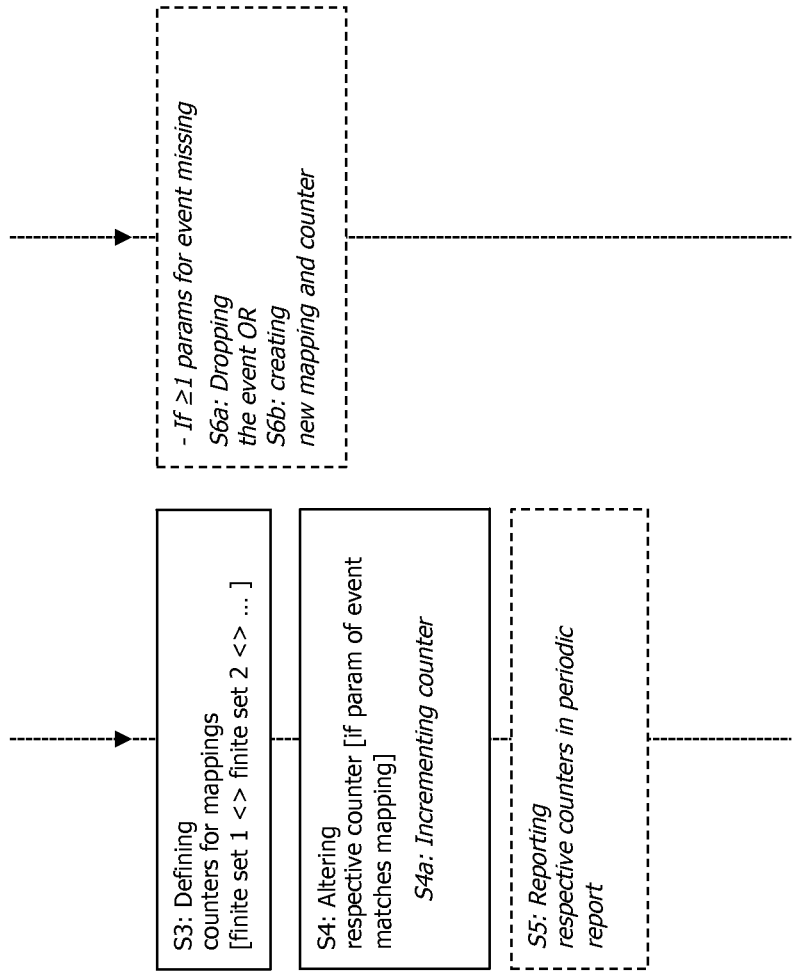
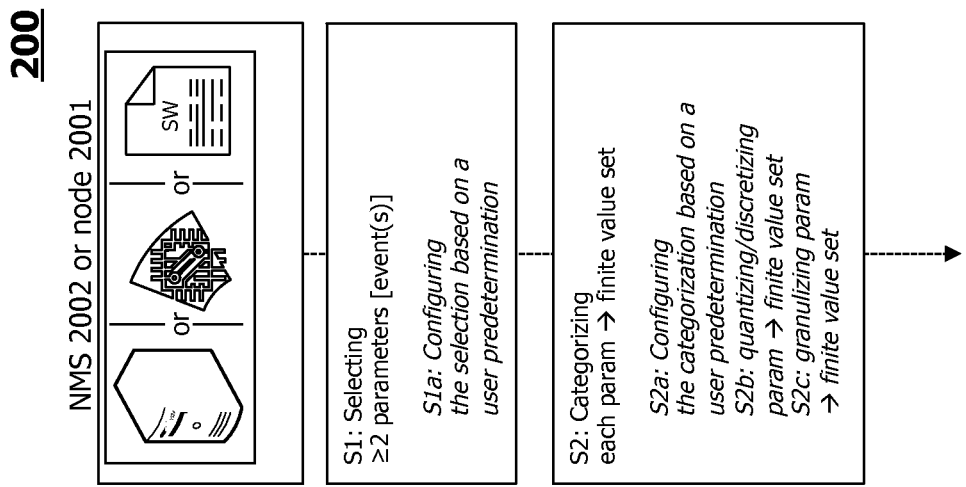
Fig. 4A

| Parameters | | Number of samples |
|---|---|---|
| param#1 | param#2 | |
| F1 | F2 | F3 |
| value1_1 | value2_1 | num1 |
| value1_1 | value2_2 | num2 |
| value1_1 | value2_3 | num3 |
| value1_2 | value2_1 | num4 |
| value1_2 | value2_2 | num5 |
| value1_2 | value2_3 | num6 |
| value1_3 | value2_1 | num7 |
| value1_3 | value2_2 | num8 |
| value1_3 | value2_3 | num9 |

Unique dedicated counter 300c conjunction 300b

Finite value set 300a

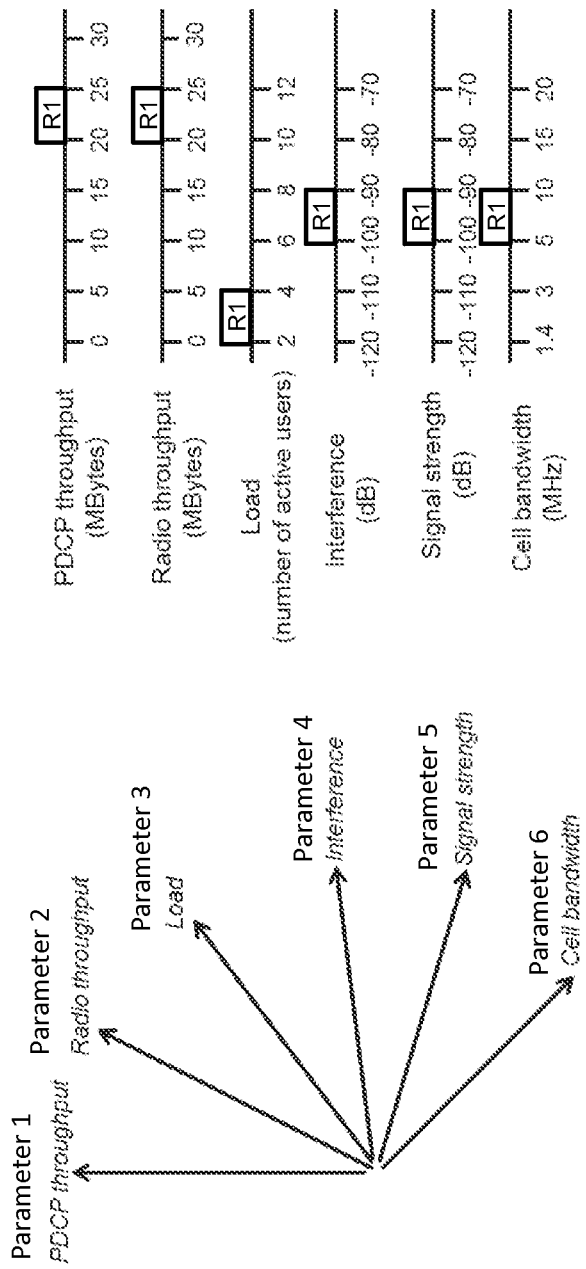

TECHNIQUE FOR EVALUATING EVENTS IN A TELECOMMUNICATION NETWORK

RELATED APPLICATIONS

This application claims priority under 35 U.S.C. §119, from EP13003304.6 as filed on 28 Jun. 2013.

TECHNICAL FIELD

The present disclosure generally relates to evaluating events in a telecommunication network based on an occurrence of a plurality of the events. The technique of the present disclosure may be embodied in one or more of a method, a computer program, an apparatus and a data structure.

BACKGROUND

With the development of new technologies in mobile telecommunication networks, Operation and Management (O&M) of said technologies meets new challenges. The increasing complexity of the successive generations of mobile systems requires more detailed O&M functionality. As an example, in legacy Radio Access Network (RAN) Management Systems (MSs), such as for the Global System for Mobile Communications (GSM), the MSs have limited O&M functionality and provide only low resolution data, whereas in Long Term Evolution (LTE), for the RAN MSs, a large number of various high resolution data sets are provided in order to log events, keep track of operation status and localize potential problems.

FIG. 1 shows the principle of event logging. As shown in FIG. 1, a mobile telecommunication network 100 comprises a Network Management System (NMS) 1001 and network nodes 1002-1, 1002-2, . . . , 1002-n attached thereto. Each of the nodes 1002-1, 1002-2, . . . , 1002-n logs one or more events and increases related counters, and reports the same to the NMS 1001. The NMS 1001 may aggregate the received reports, and may also perform event logging and counting on its own, for example by probing the nodes 1002-1, 1002-2, . . . , 1002-n.

Accordingly, the reported performance measurements are performed in the nodes 1002-1, 1002-2, . . . , 1002-n locally. There are basically two types of measurement reporting, one resides in typically periodic reports of counters, and the other one is event reporting (in the following, the different measurement types will be described). The NMS 1001 fetches these reports from the nodes 1002-1, 1002-2, . . . , 1002-n and stores them for a certain period of time.

Further, the existing technology for Performance Management (PM) used by the NMS 1001 or, alternatively, by an Operation Support System (OSS, not shown) of the mobile telecommunication network 100 provides tools for generating long-term statistics, time-series analysis and trend analysis for individual measured parameters. This may be achieved by regularly collecting PM counters reported in the nodes 1002-1, 1002-2, . . . , 1002-n at the end of a previously defined granularity period (also called Result Output Period, ROP, e.g., with a typical length of 15 minutes).

PM may also be based on more detailed measurement logs such as event logs to keep track of the operations on a finer timescale (such as seconds, milliseconds). The event logs can be used for troubleshooting and more detailed analysis. It is also possible in PM to collect event logs from various sources (e.g., from the multiple nodes 1002-1, 1002-2, . . . , 1002-n) in the network and combine (e.g., correlate) them, thus providing an end-to-end (E2E) PM functionality (such as an E2E fault localization). The events collected from the different nodes 1002-1, 1002-2, . . . , 1002-n and especially the correlated events have a large number of parameters concerning the measured values. This enables an operator to determine dependencies between Key Performance Indicators (KPIs) and parameters, and further facilitates root cause analysis of performance degradation.

The PM counters regularly collected in ROPs on a minute timescale provide a possibility to generate long-term statistics for the measured parameters separately. The event logs collected (and possibly correlated from multiple nodes 1002-1, 1002-2, . . . , 1002-n) usually on a (milli)second timescale allow for generating detailed short-term statistics and determining relations between different KPIs and parameters.

An exemplary concept for PM in the mobile telecommunication network 100 is standardized in 3rd Generation Partnership Project (3GPP) Technical Specification (TS) 32.401 V11.0.0, see Section 4. Furthermore, 3GPP provides particular performance measurement definitions, e.g., for GSM and later mobile communication networks. According to 3GPP, the generation of the performance measurement results may be performed by a Network Element (NE) (e.g., any of the nodes 1002-1, 1002-2, . . . , 1002-n) either by aggregating and calculating statistical information of events or by exposing internal variables (e.g., of the nodes 1002-1, 1002-2, . . . , 1002-n).

The performance measurement types can be classified into the following categories (as defined, e.g., in TS 32.401 V11.0.0, Section 4.2.2):

Cumulative counter: The NE maintains a running count of the event being counted. The counter is reset to a well-defined value (usually "0") at the beginning of each granularity period.

Status inspection: The NE maintains internal counts for resource management purposes. These counts are read at a predetermined rate, and the rate is usually based upon the expected rate of change of the count value. Status inspection measurements may be reset at the beginning of the granularity period and will only have a valid result at the end of the granularity period.

Gauge: The so-called gauge represents dynamic variables that may change in either direction, e.g., in both directions on a number ray. Gauges can be integer valued or real valued. If a gauge is required to produce low and high tide marks for a granularity period (e.g., minimum and maximum call duration), then it may be reinitialized at the beginning of each granularity period. If a gauge is required to produce a consecutive readout over multiple granularity periods (e.g., cabinet temperature), then it may only be reinitialized at the start of a recording interval.

Discrete Event Registration (DER): Data related to a particular event are captured. Every n-th event is registered, where n can be 1 or larger. The value of n is dependent on the frequency of occurrence of the event being measured. DER measurements may be reset at the beginning of each granularity period and may only have a valid result at the end of the granularity period.

It has been found that the existing performance measurement and reporting strategies, such as periodic reports and event logging, do not always satisfy O&M needs. For example, periodic reports in certain implementations hide the details of performance problems, while event logging is cumbersome in terms of storage and processing resources when performed over an extended period of time (e.g., months or years).

SUMMARY

Accordingly, there is a need for an implementation of a scheme that avoids one or more of the problems discussed above, or other related problems.

In a first aspect, there is provided a method for evaluating events in a telecommunication network based on an occurrence of a plurality of the events in the telecommunications network. The method comprises the steps of selecting at least two parameters of the events; categorizing each of the parameters into a respective finite set of values; defining, for at least a part of conjunctions between the respective finite sets of values, a dedicated counter per conjunction; and altering, upon the occurrence of an individual event, the respective counter if the parameters of the occurred event match the respective conjunction between the finite sets of values.

Thus, it becomes possible to obtain long-term statistics (e.g., on a timescale of months or years) on a detailed level (e.g., relations between multiple parameters). The dedicated counters may be generated for sets of two or more events, for example from correlated events where multiple parameters (including, optionally, on or more KPIs) appear at the same time. The values of the dedicated counters can be stored on a long timescale (e.g., months or years) while preserving the relations between parameters (including, optionally, one or more KPIs). The parameters may be selected as a subset of an event log parameter set (e.g., an event record parameter set).

The method may further comprise reporting the dedicated counters by means of a report. In this way, detailed long-term statistics can be supplied to, e.g., a management entity for resolving interdependencies between different network elements. This reporting may occur on a regular basis, on-demand or otherwise.

The step of selecting may further comprise configuring the at least two parameters of the events based on a user predetermination. The step of categorizing may further comprise configuring each of the parameters into the respective finite set of values based on a user predetermination. In this way, it can be ascertained that the counters on the events mirror the network behavior that is desired to be reserved.

The step of categorizing may further comprise quantizing or discretizing one or more parameters by one or more ranges so as to attain the respective finite set of values. These parameters to be quantized or discretized may be continuously numerically valued. Additionally, or as an alternative, the step of categorizing may further comprise granulizing one or more parameters by one or more collections so as to attain the respective finite set of values. The one or more parameters to be granulized may be one of nominally valued and discretely numerically valued. Accordingly, each form or representation of values in the at least two parameters can be managed for the events.

The defining step may further define, per each conjunction between the finite sets of values, the unique dedicated counter so that each event is uniquely mapped to one of the conjunctions between the finite sets of values. Every possible combination/mapping between the two parameter value sets may receive its own counter. Hence, the detail level for a report on the event is increased.

The altering step may further comprise incrementing the dedicated counter. Of course, the dedicated counter could also be manipulated in other ways depending on the prevailing needs.

The method may further comprise, in case of absence of one or more (e.g., selected or otherwise predetermined) parameter values in the occurred event, one of drop-ping the occurred event; and creating, per each missing parameter value, a new conjunction and a corresponding new unique dedicated counter. In this way, it may be ascertained that the event logging remains functional even in case some values are missing in the correlated event logs due to numerous reasons, e.g., temporary probe failure, lack of resources, etc.

One further (e.g., a third) parameter selected may be time, and the unique dedicated counters may be read out and stored upon expiry of an associated granularity period in the time domain. When the further parameter is time, a new finite set of values may be categorized for the time parameter, and new conjunctions may be defined between the finite set of values for the time parameter and the finite sets of values for the at least two further parameters. Accordingly, the event logging takes into account the special nature of the parameter time.

In a second aspect, there is provided a computer program product comprising program code portions for performing the method disclosed herein, when the computer program product is executed on one or more computing devices. The computer program product may be stored on a computer readable recording medium.

In a third aspect, there is provided an apparatus for evaluating events in a telecommunication network based on an occurrence of a plurality of the events in the telecommunications network. The apparatus comprises a component configured to select at least two parameters of the events; a component configured to categorize each of the parameters into a respective finite set of values; a component configured to define, for at least a part of conjunctions between the respective finite sets of values, a dedicated counter per conjunction; and a component configured to alter, upon the occurrence of an individual event, the respective counter if the parameters of the occurred event match the respective conjunction between the finite sets of values.

One or more of the individual components, such as the configuration component, the categorization component and the definition component, may be realized in the form of a data structure within a data storage (e.g., a database). Alternatively, one or more of those components may be realized in the form of a user interface (such as a graphical user interface, GUI) configured to receive a user input.

In a refinement of the third aspect, the apparatus may be accommodated in a Network Management System, NMS. Accordingly, the NMS may not only store the raw data reported to it, but is also enabled to post-process the raw data, e.g., combining the logs from different sources or aggregating the measurements thus obtained.

In a further refinement of the third aspect, an instance of the apparatus may be accommodated per at least one network node. In this way, event logs generated by different network elements or nodes can be correlated in order to provide a full picture of given network activity (expressed by the events).

In a fourth aspect, there is provided a data structure for evaluating events in a telecommunication network based on an occurrence of a plurality of the events in the telecommunications network, the events pertaining to at least two parameters, the data structure comprising a first field configured to store a first parameter of the at least two parameters categorized into an own first finite set of values; a second field configured to store a second parameter of the at least two parameters categorized into an own second finite set of values, wherein the first and second fields contain at least a part of conjunctions between the first and second finite sets of values; and a third field configured to store a dedicated counter per conjunction.

In a refinement of the fourth aspect, the first finite set of values may comprise N values, N being an integer greater than one, and the second finite set of values may comprise M values, M being an integer greater than one, so that the first and second fields may each comprise (up to) N*M paired entries ordered such that several con-junctions or every con-junction between the first and second finite sets of values corresponds to one paired entry per conjunction.

Still further, it is to be noted that the method aspects may also be embodied on the apparatus of the fourth and fifth aspects comprising at least one processor and/or appropriate means for carrying out any one of the method steps.

BRIEF DESCRIPTION OF THE DRAWINGS

Embodiments of the technique presented herein are described herein below with reference to the accompanying drawings, in which:

FIG. 1 shows the principle of event logging of the related art;

FIG. 2A shows a first embodiment of event evaluation;

FIG. 2B shows a second embodiment of event evaluation;

FIG. 4A shows a method embodiment which also reflects the interaction between the components of the device embodiment;

FIG. 5 shows a data structure embodiment; and

FIG. 6 shows a use case example of the technique of the present disclosure.

DETAILED DESCRIPTION

Figure 3:
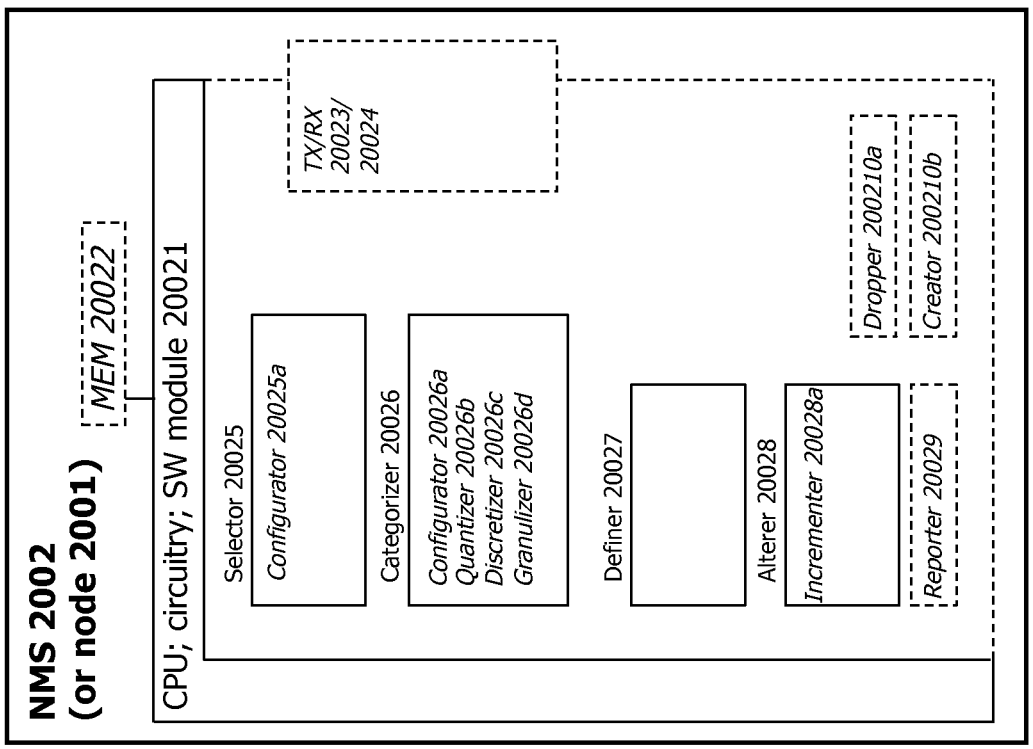
FIG. 3 shows components comprised in an exemplary device embodiment realized in the form of an NMS or any network node.

In the following description, for purposes of explanation and not limitation, specific details are set forth—such as particular signaling steps—in order to provide a thorough understanding of the technique presented herein. It will be apparent to one skilled in the art that the present technique may be practiced in other embodiments that depart from these specific details. For example, the embodiments will primarily be described in the context of LTE or LTE-Advanced (LTE-A); however, this does not rule out the use of the present technique in connection with (legacy or future) technologies consistent with the event evaluation. The following embodiments will primarily be described with respect to the 3GPP TSs mentioned above. It will be appreciated that the present disclosure could also be realized in connection with different Performance Management (PM) specifications.

Moreover, those skilled in the art will appreciate that the services, functions and steps explained herein may be implemented in a processing circuit comprising fixed circuitry, programmed circuitry, or both. For example, in one embodiment, the processing circuit is a microprocessor, such as a general purpose computer processor, that is specially adapted to carry out the operations disclosed herein, based on its execution of computer program instructions comprising a computer program product stored in a non-transitory computer-readable medium. Additionally, or alternatively, the processing circuit is implemented as an Application Specific Integrated Circuit (ASIC), a Digital Signal Processor (DSP), a Field Programmable Gate Array (FPGA) or other digital processing circuitry. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

FIG. 2A shows a first embodiment of event evaluation. As shown in FIG. 2A, a mobile telecommunication network 200 comprises an NMS 2001 and multiple network nodes 2002-1, 2002-2, . . . , 2002-$n$ (e.g., Network Elements, NE). Each of the nodes 1002-1, 1002-2, . . . , 1002-$n$ may log one or more events and related counters, and may report the same to the NMS 2001. The NMS 1001 may aggregate the received reports, and may also perform event logging on its own, e.g., by probing the nodes 2002-1, 2002-2, . . . , 2002-$n$. The nodes 2002-1, 2002-2, . . . , 2002-$n$ are not restricted to one node type or one domain. Rather, they can be multiple node types from multiple domains (e.g., an evolved NodeB (eNB) from RAN, a Multimedia Management Entity (MME), a Serving Gateway (S-GW) of the Core Network (CN), etc.). The nodes may be realized as or co-located with Deep Packet Inspection (DPI) probe modules listening on standard interfaces between the network nodes 2002-1, 2002-2, . . . , 2002-$n$.

One aspect presented by this disclosure is a framework of generalized periodic or non-periodic reports (more specifically, generalized cumulative or composite counters) partially called composite counters 300 hereinafter. An exemplary system architecture in this regard is shown in FIG. 2A, wherein a certain type of counter 300 is generated from the events. That certain type of counter called the composite counter 300 differs, inter alia, from the conventional counters in that while conventional counters focus on only one event parameter, in composite counter 300 multiple parameter values are collected at the same time. A data aggregation is provided in this way, where the amount of data is reduced compared to the event logs but inter-dependencies between the parameters are still preserved.

Without loss of generality, for the purpose of the present disclosure, two main classes of performance monitoring in mobile telecommunication systems may be distinguished, providing different functionalities:

Periodic Reports

Performance monitoring types in this class may be cumulative counters, status inspection or gauge-like monitoring as discussed above. This type of performance reporting provides basic statistics (counting certain events/summing certain variables, histogram of certain variables, etc.) at the end of a pre-defined granularity period. Typical values for the granularity period are, for instance, 5 minutes, 15 minutes, 30 minutes or 1 hour. Periodic reports are usually collected per measurement unit (where the unit can be a cell, a Radio Base Station (RBS), a Radio Network Controller (RNC) or a higher aggregation unit) every time the granularity period expires. Periodic measurements are not combined with other measurements, i.e., they focus on one parameter at a time; however, this does not rule out the possibility to focus also on two or more parameters at the same time. Periodic reports may be node-local and they may reflect only the performance of the NE that generates the PM report.

Applying periodic reports is a robust way of monitoring/following KPIs per cell, per node or per network. They give aggregated and statistical values for specific KPIs in each granularity period. Periodic reports can be applied in the NMS 2002 (or OSS, not shown) to indicate problems in certain network units (cell/node/domain/network) within a granularity period, to follow KPIs for a long time, to perform trend analysis, and to make predictions based on time series.

Event Logs

Performance monitoring types in this class can be DER-like. This type of performance reporting may provide a list of event records where one event record contains various data (parameters) related to a particular event. Optionally, if a timestamp value is attached to each event record, then higher granularity measurements may be reported than the granularity period. In this case, the reporting may not be periodic but rather on-demand, as soon as an event occurs. Further optionally, the frequency of events can be configured (e.g., logging every n-th event, where n can be 1 or larger) to reduce intensive data flooding.

Events may contain low-level, high-granularity information obtained from the NEs (or nodes 2002-1, 2002-2, . . . , 2002-n). Example fields ("parameters") in an event record from the event log may be information, e.g., on timestamp, user ID, cell/node ID, event-related parameters, result codes, etc.

Event logs may provide information on elementary events (e.g., handover request, session drop, sending request for a web page download, etc.). Further, events may be bound to subscribers. Event logs may be further processed and correlated with events from other data sources. An implementation of event correlation may reside in collecting a signaling sequence related to one subscriber's session from the events, e.g., in the Radio Network (RN) and Core Network nodes 2002-1, 2002-2, . . . , 2002-n.

Examples for the above-described compound events are Radio Access Bearer (RAB) session initiation, handover procedure, etc. Another implementation of event correlation may reside in a user-plane session report supplemented by information from other sources, e.g., subscription end-to-end information, User Equipment (UE) information, server information thus providing E2E characteristics. The compound events are not necessarily bound to network elements or nodes 2002-1, 2002-2, . . . , 2002-n. Rather, the compound events may span over multiple nodes/domains.

Event logging can generally be applied to make a more detailed analysis of performance problems. Both local events and correlated events enable for trouble-shooting, root-cause analysis and fault localization in mobile networks. It is thus possible to implement subscriber tracking and support the subscribers' service assurance.

To sum up, as described herein above, event logs may provide valuable insights into detailed phenomena occurring in network elements or nodes 2002-1, 2002-2, . . . , 2002-n. When event logs, generated by different network elements or nodes 2002-1, 2002-2, . . . , 2002-n, are correlated in order to provide a full picture of given network activity, e.g., describing the E2E quality of service of a complete traffic flow, the presented composite counters 300 (to be described herein below in more detail) may (e.g., implicitly) be calculated and stored on a central entity having access to all the network nodes, thus having access to their respective event logs.

FIG. 2B shows a second embodiment of event evaluation. In essence, the mobile telecommunications network 200 shown in FIG. 2B corresponds to the mobile communications network 200 shown in FIG. 2A.

That is, as shown in FIG. 2B, an alternative implementation may reside in the usage of composite counters 300 (additionally or alternatively) on the network elements or nodes 2002-1, 2002-2, . . . , 2002-n. This approach is particularly useful if
  storing event logs on the network node is inevitable and the local storage capacity does not meet the required volume;
  it is sufficient to report composite counters 300 of local parameters for building correlated event logs centrally, instead of the raw event logs.

Moreover, the creation of the local composite counters 300 may require the implementation of a parameter selector, a binning and a counter module (or steps of selecting, categorizing and altering, respectively, to be described herein below in conjunction with FIGS. 4A and 4B in more detail) locally. Furthermore, while calculating these local counters, network-wide counters can rely on raw event logs and/or local composite counters 300 depending on the use case.

FIG. 3 shows components comprised in an exemplary device embodiment realized in the form of the NMS 2002 (or node 2002-1, 2002-2, . . . , 2002-n, or otherwise). As shown in FIG. 3, the NMS 2002 comprises a core functionality (e.g., one or more of a Central Processing Unit (CPU), dedicated circuitry and/or a software module) 20021, an optional memory (and/or database) 20022, an optional transmitter 20023 and an optional receiver 20024. Moreover, the NMS 2002 (or the node 2002-1, 2002-2, . . . , 2002-n) comprises a selector 20025, a categorizer 20026, a definer 20027, an alterer 20028, an optional reporter 20029 and an optional dropper 200210a/creator 200210b. In turn, the selector 20025 may comprise an optional configurator 20025a, the categorizer 20026 may comprise an optional configurator 20026a, an optional quantizer 20026b, an optional discretizer 20026c and an optional granulizer 20026d, and the alterer 20028 may comprise an incrementer 20028a.

In the following paragraphs, assume that x=1 (in case of the node 2002-1, 2002-2, . . . , 2002-n) or x=2 (in case of the NMS 2002, as shown in FIG. 3). As partly indicated by the dashed extensions of the functional block of the CPUs $200x1$, the selector 20025, the categorizer 20026, the definer 20027, the alterer 20028, the reporter 20029, the dropper 200210a/creator 200210b, the configurator 20025a, the configurator 20026a, the quantizer 20026b, the discretizer 20026c, the granulizer 20026d, and the incrementer 20028a (of the NMS 2002) as well as the memory $200x2$, the transmitter $200x3$ and the receiver $200x4$ may at least partially be functionalities running on the CPUs $200x2$, or may alternatively be separate functional entities or means controlled by the CPUs $200x1$ and supplying the same with information. The transmitter and receiver components $200x3$, $200x4$ may be realized to comprise suitable interfaces and/or suitable signal generation and evaluation functions.

The CPUs $200x1$ may be configured, for example, using software residing in the memories $200x2$, to process various data inputs and to control the functions of the memories $200x2$, the transmitter $200x3$ and the receiver $200x3$ (as well as the selector 20025, the categorizer 20026, the definer 20027, the alterer 20028, the reporter 20029, the dropper 200210a/creator 200210b, the configurator 20025a, the configurator 20026a, the quantizer 20026b, the discretizer 20026c, the granulizer 20026d, and the incrementer 20028a (of the NMS 2002)). The memory $200x2$ may serve for storing program code for carrying out the methods according to the aspects disclosed herein, when executed by the CPUs $200x1$.

It is to be noted that the transmitter $200x3$ and the receiver $200x4$ may be provided as an integral transceiver, as is indicated in FIG. 3. It is further to be noted that the transmitters/receivers 20013, 20014 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the selector 20025, the categorizer 20026, the definer 20027, the alterer 20028, the reporter 20029, the dropper 200210a/creator 200210b, the configurator 20025a, the configurator 20026a, the quantizer 20026b, the discretizer 20026c, the granulizer 20026d, and the incrementer 20028a (of the NMS 2002), or the respective functionalities, may also be implemented as a chipset, module or subassembly. In a further realization, one or more of the selector 20025, the categorizer 20026 and the definer 20027 may be realized in the form of a user interface (e.g., a GUI) with associated processing logic for generating an associated data structure.

FIG. 4A shows a method embodiment which also reflects the interaction between the components of the device embodiment illustrated in FIG. 3. In the signaling diagram of FIG. 4A, time aspects between signaling are reflected in the vertical arrangement of the signaling sequence as well as in the sequence numbers. It is to be noted that the time aspects indicated in FIG. 4A do not necessarily restrict any one of the method steps shown to the step sequence outlined in FIG. 4A. This applies in particular to method steps that are functionally disjunctive with each other. For instance, the reporting step S5 and the dropping/creating step S6a/S6b are shown to take place in time one after another; however, this does not preclude that the steps are carried out in reverse order or (substantially) simultaneously.

In detail, in step S1, the selector 20025 of the NMS 2002 performs selecting at least two parameters of the events. As an example, a subset of the parameters of an event record in a conventional event log may be selected. The selection may be represented by a specific data structure configuration. Optionally, in step S1a, the configurator 20025a of the NMS 2002 performs configuring the selecting of the at least two parameters of the events responsive to a user predetermination (e.g., a user configuration).

Further, in step S2, the categorizer 20026 of the NMS 2002 performs categorizing, or binning, each of the selected parameters into a respective finite set of values, or bin (see FIG. 5 to be described herein below). Again, this may be represented by a specific data structure configuration. In this connection, it is noted that the term "finite set of values" can be interpreted as a mathematical set of denumerable or innumerable elements or objects; at the very least, the set of values comprises two values. Optionally, in step S2a, the configurator 20026a of the NMS 2002 performs configuring the categorizing of each of the parameters into the respective finite set of values based on a user predetermination (e.g., a user input).

Still further, in an optional step S2b, the quantizer 20026b or the discretizer 20026c performs quantizing or discretizing each parameter by one or more ranges so as to attain the respective finite set of values, the parameters to be quantized or discretized being continuously numerically valued. In this case, it is noted that also a set of innumerable values may be quantized/discretized to a set of denumerable values; without loss of generality, in a simplest case, also a set of innumerable values can be discretized/quantized into two values, e.g., falling or not falling in a specific range (see FIG. 6 to be described herein below).

Alternatively, in an optional step S2c, the granulizer 20026d of the NMS 2002 performs granulizing each parameter by one or more collections so as to attain the respective finite set of values. The parameters to be granulized may be one of nominally valued and discretely numerically valued. However, it is to be noted that although not restrictive for the present disclosure, the case of a set of innumerable values is quite seldom; given the nature of event logging in a mobile communication network, it is likely that a measurement, with a given accuracy of the measurement, will produce a set of denumerable values. For instance, with reference to FIG. 6, a measurement of the signal strength may produce values of an accuracy 0.001 in the range of −50 dB (direct proximity of the BTS) and −120 dB (signal strength no longer discernible), resulting in a set of approximately 70,000 (discrete) values.

The user predetermination can be performed in various ways, typically before or during system setup. Generally, parameter configuration and binning configuration are performed once before the actual performance measurements start.

Still further, in step S3, the definer 20027 of the NMS 2002 performs defining, for at least a part of conjunctions between the respective finite sets of values, a dedicated counter per conjunction. As understood herein, a conjunction may be realized in the form of a mapping, or link, between two or more finite sets of values, or bins. The mapping may be represented by a specific data structure configuration.

Finally, in step S4, the alterer 20028 of the NMS 2002 performs altering, upon the occurrence of an individual event during the performance measurements, the respective counter if the parameters of the occurred event match the respective conjunction between the finite sets of values. To this end, in an optional step S4a, the incrementer 20028a of the NMS 2002 performs incrementing the unique dedicated counter.

In an optional step S5, the reporter 20029 of the NMS 2002 performs reporting the unique dedicated counters by means of a report. The reporting may be performed periodically, on-demand (e.g., using a pulling mechanism), or otherwise.

As a refinement, the defining step S3 may further define, per each conjunction between the finite sets of values, the unique dedicated counter so that each event is uniquely mapped to one of the conjunctions between the finite sets of values. This allows for a full-scale, one-to-one correspondence between all possible combinations between two (or more) parameters, yielding an utmost correspondence between two parameters; however, in order to avoid a state explosion, it is always possible to define a maximum number of conjunctions, which conjunction conjunct only values of interest between the two (or more) parameters.

As a further refinement, in an optional step S6a/S6b, the dropper 200210a/creator 200210b of the NMS 2002 performs, in case of absence of one or more parameter values in the occurred event, one of dropping the occurred event and creating, per each missing parameter value, a new conjunction 300b and a corresponding new unique dedicated counter 300c.

In other words, it might occur that some values are missing in the correlated event logs due to numerous reasons, e.g., temporary probe failure, lack of resources, etc. When this is the case, a binning module (a special implementation of the categorizer 20026) can apply one of the following measures:

The binning module drops those event logs that are not complete, i.e., any of the parameters within are missing. This approach enables keeping the complexity of composite counters 300 at a hypothetical level where no missing parameter values exist.
 The binning module creates an additional bin for each parameter, and associates the missing parameter values to those bins. Then, the number of bins increases by one for each parameter. By maintaining counters for bin combinations in which one or more parameters participate with their missing value bin, loss of information is avoidable, since relations between the non-missing parameter values are still preserved.

As a further refinement, one further parameter may be time, and the unique dedicated counters may be read out and stored upon expiry of a granulity period in the time domain. When the one further parameter is time, a new finite set of values may be categorized for the time parameter, and new conjunctions may be defined between the finite sets of values for the time parameter and the finite sets of values for the at least two parameters.

In other words, time is a variable in the parameter space that may require special treatment, since time handling is implementation-dependent. For instance, time may be discretized with a certain granularity period (e.g., seconds, minutes, etc.). One way of storing composite counters 300 may reside in closing and storing the current counter and starting a new counter with zero values after the expiry of the granularity period. Another way of handling time may reside in including time as a separate parameter where the bins are the granularity periods. In both type of implementations, more time periods may be further aggregated by summing up the counters within all periods. In this way, required storage space may be further decreased when decreasing the time granularity.

That is, a trade-off between accuracy and storage space requirement can be adjusted as desired: the shorter the granularity in time, the higher is the accuracy and the storage space requirement; and consequently, the longer the granularity in time, the lower is the accuracy and the storage space requirement. For instance, time granularity can be adjusted to a given storage space constraint (if storage space is a scarce resource depending on the application). Likewise, required storage space can be allocated according to a given time granularity (if time granularity is to be kept below a certain level, e.g., in a real-time application).

In light of the above, one embodiment of the present disclosure may be summarized in that one or more composite counters 300 are derived from events (preferably from compound/correlated events) in the following way: 1) Choosing a subset of parameters in the event log; 2) Proper binning (categorizing) of the value-set of the selected parameters is chosen so that all or certain parameter values of an event can be put into a unique bin. A bin may be a certain range (in case of numeric parameters) or a certain collection (in case of nominal parameters); 3) Setting up a multi-dimensional discrete parameter space from the individual parameter bins, where there is a counter value in each multi-dimensional bin of the parameter space (all events may be uniquely mapped to a multi-dimensional bin in the parameter space); 4) For each event, the counter value of the multi-dimensional bin corresponding to that event is increased. In this way, a medium level of details is maintained where some dedicated variables are collected together. This structure may enable the network operator to create relevant long-term statistics, to find relations between one or more parameters and one or more KPIs.

Figure 4B:
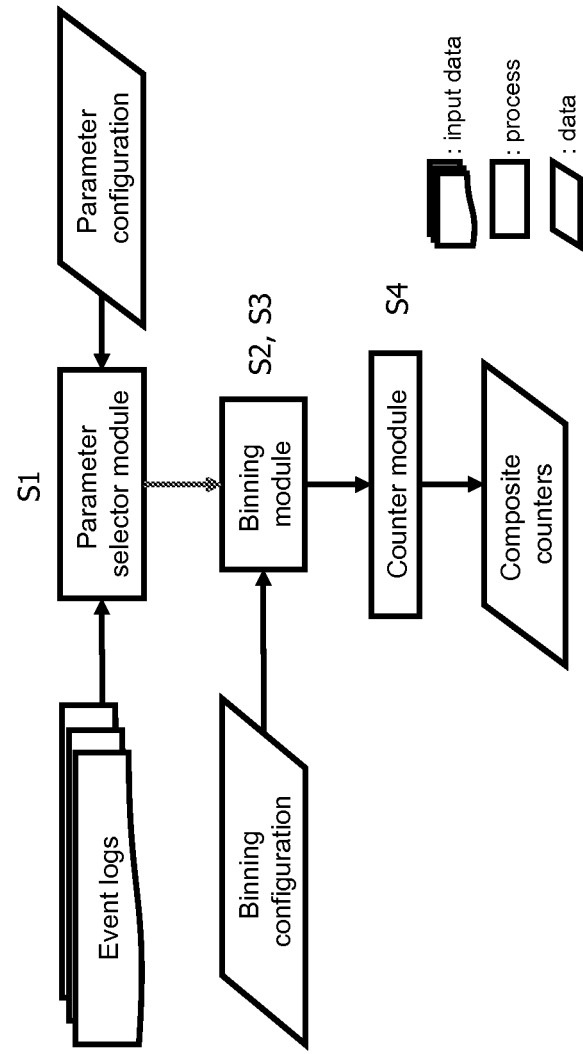
FIG. 4B shows a modified method embodiment which also reflects the interaction between the components of the device embodiment.

FIG. 4B shows a modified method embodiment which also reflects the interaction between the components of the device embodiment in FIG. 3 and which may be combined with the embodiment of FIG. 4A. In detail, FIG. 4B shows a method on how input data and user configurations, or predeterminations, are handled resulting in composite counters 300. The following explanations provide details about the building modules of the method flow:

Step S1 (as a non-limiting special case of the selector 20025), parameter selector module: the parameter selector module may filter those parameters from detailed event logs that are chosen by the user of the system, e.g., via the parameter configuration setting. The selected parameters may be jointly forwarded to the binning module.

Steps S2, S3 (as a non-limiting special case of the categorizer 20026 and/or the definer 20027), binning module: this module may classify each of the received parameters into a bin, chosen as defined by a binning configuration. Nominal parameters can be used in their original state, or multiple nominal values can be merged together. Numeric parameters may be discretized properly. From this point on, instead of the measured/reported values of the selected parameters, their bins may be forwarded to the next module.

Step S4 (as a non-limiting special case of the alterer 20028), counter module: responsive to occurrence of individual events, the counter module may increment the counters, one dedicated to each one of the existing parameter bin combination, corresponding to the received parameter bins belonging to an event log. The resulting composite counters 300 preserve detailed correlations and owing to their compact format, and can be stored for long periods of time.

FIG. 5 shows a data structure embodiment for use in any of the above or other embodiments. The data structure embodiment may be implemented in the form of a data record or set of data records (e.g., in database 20022 of FIG. 2).

In detail, there is provided a data structure 300 for evaluating events in a telecommunication network 200 based on an occurrence of a plurality of the events in the telecommunications network, the events pertaining to at least two parameters. The data structure 300 comprises a first field F1 configured to store a first parameter of the at least two parameters categorized into an own first finite set 300*a* of values, a second field F2 configured to store a second parameter of the at least two parameters categorized into an own second finite set 300*a* of values. The first and second fields F1, F2 contain at least a part of conjunctions 300*b* between the first and second finite sets of values, and a third field F3 configured to store a dedicated counter 300*c* per conjunction.

In this context, for brevity and simplicity of description, FIG. 5 shows only two parameters #1 and #2 in order to describe the principles of the present disclosure. However, this does not rule out that further fields for a third, fourth . . . n-th parameter may be defined as needed.

As refinement, the first finite set of values may comprise N values, N being an integer greater than one, and the second finite set of values may comprise M values, M being an integer greater than one, so that the first and second fields each comprise N*M paired entries ordered such that every conjunction between the first and second finite sets of values corresponds to one paired entry.

In the example shown in FIG. 5, the first parameter #1 is categorized into 3 values (value1_1 to value1_3), whereas the second parameter #2 is equally categorized into 3 values (value2_1 to value2_3, finite value set) 300*a*. As shown in FIG. 5, each possible combination (rows in FIG. 5) of the first and second parameter may be defined a mapping/conjunction 300*b* and a corresponding unique dedicated counter 300*c* (num1 to num9). Note that even in this simplistic case, the number of mappings and counters already amounts to 9 (3*3); accordingly, as described above, it is also feasible to define only mappings 300*b* and counters 300*c* for paired values of interest (instead of triples, etc.).

In sum, the basic data structure 300 of the composite counters is shown in FIG. 5. As shown, two parameters (param#1 and param#2) are logged, each having 3 different discrete values (value1_1 to value1_3, and value2_1 to value2_3). A counter value 300*c* (number of samples num1 to num9) may be maintained for (a subset of) each possible parameter value combination. As soon as an event is detected, the counter value 300*c* corresponding to the parameter values of the event is incremented. The set of parameters to use in composite counters is configurable. All parameters should preferably be discrete (for the details of the discretization/ binning, see the above description). The binning of the parameters may be configurable. It will be understood that instead of having discrete values as illustrated in FIG. 5, the binning, or categorizing, could also result in parameter ranges depending on the nature of the parameters to be blocked.

FIG. 6 shows a use case example of the technique of the present disclosure. Specifically, an example of the dimensions to be selected and their bins (categories) is shown in FIG. 6. System Key Performance Indicators or KPIs, such as throughput, load, radio signal strength, interference and bandwidth, are logged together with event parameters in the same data set. For the purpose of the present disclosure, KPIs and event parameters are regarded to be on the same level. They both may be granulized or otherwise categorized, and an individual counter may thus correspond to a multi-dimensional data structure that may contain a mixture of one or more KPIs and event parameters. For this reason, as partially understood herein, the general term parameter may also denote a KPI.

The present approach enables a further analysis of inter-dependencies between KPIs and parameters or between different individual parameters. The binning may be made so that the bins are not too small to get sufficient numbers of samples in the bins. On the other hand, the bin width should not be too large in order to get relevant statistical relations between the parameters.

As a non-limiting example, a simplest case may reside in a range R1 in each parameter, yielding a simple yes/no decision whether an actual value falls into or out of the range R1. For example, a global event scenario 'high throughput with low load and medium interference, signal strength and cell bandwidth' may be defined by bins of:

20 to 25 Mbytes PDCP throughput
20 to 25 Mbytes radio throughput
2 to 4 active users
−100 to −90 dB interference level
−100 to −90 dB signal strength level
5 to 10 MHz cell bandwidth.

Note that already in this simple case, if all possible mappings 300b are to be logged, this would require 5!=120 unique dedicated counters 300c.

For example, over a given time, five measurements are taken, and all five measurements yield [22 Mbytes, 23 Mbytes, 11 users, −115 dB, −75 dB, 17 MHz]. Those measurements could be described as 'loaded but clear high-capacity cell'. Compared to the global event scenario, only the parameters PDCP throughput and radio throughput would fall into the defined category (bin) R1, thus only incrementing the one counter of the mapping (20 to 25 Mbytes PDCP throughput) vs. (−20 to 25 Mbytes radio throughput) five times. When evaluating the above global event, this would allow to draw a conclusion that the throughputs have been high (corresponding to the only incremented counter), but the load was "not low" (no counters incremented for mappings on the load) and that the cell situation was "not medium" (no counters incremented for mappings on interference, signal strength and cell bandwidth).

The present disclosure provides in some embodiments one or more of the following advantages. High detail level of performance is preserved, since the granularity is adjustable and the relations and dependencies between the parameters and KPIs can be derived. Fault localization is enabled, and problems spanning more nodes (e.g., high message delays) can be detected. Event logging storing very detailed information obtained from very frequent events for a long time is rendered easy and inexpensive. Important relations are preserved in a compact format once the NMS collects and correlates event logs from different network nodes. Moreover, different PM applications in mobile telecommunication networks interfacing the composite counters are facilitated, such as one or more of:

Statistical analysis (trends, dependencies, scenarios, predictions, etc.);
Optimization support;
Planning support;
Root cause analysis;
Network benchmarking (when having access to multiple networks).

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

What is claimed is:

1. A method of evaluating events in a telecommunication network, said events occurring in relation to operation of the telecommunication network, and said method comprising:
defining a set of quantized values for each of two or more event parameters that are associated with events of a certain type;
implementing a counter per conjunction, for one or more conjunctions of the sets of quantized values, each conjunction being one of the unique combinations of quantized values possible among the sets of quantized values;
detecting occurrences of events of the certain type; and
for each detected occurrence:
for each of the two or more event parameters, quantizing an actual value of the event parameter, as measured for the detected occurrence, into a corresponding one of the quantized values in the set of quantized values defined for the event parameter; and
responsive to determining that the quantized values of the two or more event parameters match one of the conjunctions for which a corresponding counter is implemented, incrementing the counter corresponding to the matched conjunction; and
outputting counter values from the per-conjunction counters, for use in a performance monitoring system associated with the telecommunication network.

2. The method of claim 1, wherein implementing a counter per conjunction comprises implementing counters for all conjunctions of the sets of quantized values.

3. The method of claim 1, further comprising storing a data structure that logically associates each counter with the corresponding unique combination of quantized values among the sets of quantized values.

4. The method of claim 1, further comprising maintaining an overall count for the detected occurrences.

5. The method of claim 1, further comprising determining for which conjunctions to implement counters, in dependence on user input or configuration data.

6. The method of claim 1, further comprising, defining one or more additional conjunctions for handling detected occurrences where the actual value is missing for any of the two or more event parameters, implementing a counter corresponding to each of the one or more additional conjunctions, and incrementing the corresponding counter responsive to detecting occurrences of events of the certain type where the actual value is missing for any of the two or more event parameters.

7. The method of claim 1, wherein the two or more parameters include a time parameter that is based on an associated granularity period in the time domain.

8. An apparatus configured for evaluating events in a telecommunication network, said events occurring in relation to operation of said telecommunication network, and said apparatus comprising:
   interface circuitry including receiver circuitry configured to receive event information for event occurrences in the telecommunication network;
   a processing circuit and associated memory, said processing circuit operatively associated with the interface circuitry and configured to:
      define a set of quantized values for each of two or more event parameters that are associated with events of a certain type;
      implement a counter per conjunction, for one or more conjunctions of the sets of quantized values, each conjunction being one of the unique combinations of quantized values possible among the sets of quantized values;
      detect occurrences of events of the certain type, based on the received event information; and
      for each detected occurrence:
         for each of the two or more event parameters, quantize an actual value of the event parameter, as measured for the detected occurrence, into a corresponding one of the quantized values in the set of quantized values defined for the event parameter; and
         responsive to determining that the quantized values of the two or more event parameters match one of the conjunctions for which a corresponding counter is implemented, increment the counter corresponding to the matched conjunction; and
      output counter values from the per-conjunction counters, for use in a performance monitoring system associated with the telecommunication network.

9. The apparatus of claim 8, wherein the processing circuit is configured to implement counters for all conjunctions of the sets of quantized values.

10. The apparatus of claim 8, wherein the processing circuit is configured to store a data structure that logically associates each counter with the corresponding unique combination of quantized values among the sets of quantized values.

11. The apparatus of claim 8, wherein the processing circuit is configured to maintain an overall count for the detected occurrences.

12. The apparatus of claim 8, wherein the processing circuit is configured to determine for which conjunctions to implement counters, in dependence on user input or configuration data.

13. The apparatus of claim 8, wherein the processing circuit is configured to define one or more additional conjunctions for handling detected occurrences where the actual value is missing for any of the two or more event parameters, implement a counter corresponding to each of the one or more additional conjunctions, and increment the corresponding counter responsive to detecting occurrences of events of the certain type where the actual value is missing for any of the two or more event parameters.

14. The apparatus of claim 8, wherein the two or more parameters include a time parameter that is based on an associated granularity period in the time domain.

\* \* \* \* \*